(12) United States Patent
Allen et al.

(10) Patent No.: US 7,953,919 B2
(45) Date of Patent: *May 31, 2011

(54) PHYSICAL BLOCK ADDRESSING OF ELECTRONIC MEMORY DEVICES

(75) Inventors: Walter Allen, Wellington, CO (US); Sunil Atri, Austin, TX (US); Joseph Khatami, Austin, TX (US)

(73) Assignee: Spansion LLC, Sunnyvale, CA (US)

( * ) Notice: Subject to any disclaimer, the term of this patent is extended or adjusted under 35 U.S.C. 154(b) by 587 days.

This patent is subject to a terminal disclaimer.

(21) Appl. No.: 11/963,306

(22) Filed: Dec. 21, 2007

(65) Prior Publication Data

US 2009/0164696 A1 Jun. 25, 2009

(51) Int. Cl.
*G06F 12/06* (2006.01)
*G06F 13/00* (2006.01)

(52) U.S. Cl. ............ 711/1; 711/100; 711/103; 711/154

(58) Field of Classification Search ................ 711/104, 711/100, 154, 1, 103, 200
See application file for complete search history.

(56) References Cited

U.S. PATENT DOCUMENTS

| | | | |
|---|---|---|---|
| 6,631,453 B1 * | 10/2003 | Friday | 711/163 |
| 2002/0178143 A1 * | 11/2002 | Fujimoto | 707/1 |
| 2003/0016186 A1 * | 1/2003 | Watanabe et al. | 343/912 |
| 2004/0028068 A1 * | 2/2004 | Kizhepat | 370/420 |
| 2004/0073727 A1 * | 4/2004 | Moran et al. | 710/74 |
| 2005/0114589 A1 * | 5/2005 | Lofgren et al. | 711/103 |
| 2005/0144365 A1 * | 6/2005 | Gorobets et al. | 711/103 |
| 2006/0087957 A1 * | 4/2006 | Kelly et al. | 369/275.1 |
| 2006/0143365 A1 * | 6/2006 | Kikuchi | 711/103 |
| 2006/0184720 A1 * | 8/2006 | Sinclair et al. | 711/103 |
| 2007/0143561 A1 * | 6/2007 | Gorobets | 711/170 |
| 2007/0143570 A1 * | 6/2007 | Gorobets et al. | 711/203 |
| 2007/0143571 A1 * | 6/2007 | Sinclair et al. | 711/203 |
| 2009/0165020 A1 * | 6/2009 | Allen et al. | 719/314 |

FOREIGN PATENT DOCUMENTS

EP  1100001 A2 *  5/2001

OTHER PUBLICATIONS

An Efficient NAND Flash File System for Flash Memory Storage; Lim et al.; IEEE Transactions on Computers, vol. 55, No. 7 (Jul. 2006); pp. 906-912.*
Introduction to Flash Memory; Bez et al.; Proceedings of the IEEE, vol. 91, No. 4 (Apr. 2003); pp. 489-502.*
Yaffs: the NAND-specific flash file system—Introductory Article; Manning, Charles; posted by Wookey to http://www.yaffs.net/yaffs-nand-specific-flash-file-system-introductory-article Jul. 26, 2006; originally published at LinuxDevices.org, Sep. 20, 2002.*

* cited by examiner

*Primary Examiner* — Tuan V. Thai
(74) *Attorney, Agent, or Firm* — Turocy & Watson, LLP

(57) ABSTRACT

Systems and/or methods that facilitate accessing data to/from a memory are presented. An electronic memory component can operate with reduced data access times by eliminating/reducing the use of logical block addressing and employing physical block addressing. Data access is thereby directly associated with the physical location of the stored bits and the need to translate between a logical address and the physical address is reduced or eliminated. This can be even more efficient under asymmetric data access patterns. Further, legacy support for logical block addressing can be included to provide backward compatibility, mixed mode operation, or complimentary mode operation.

18 Claims, 11 Drawing Sheets

PHYSICAL BLOCK ADDRESSING OF ELECTRONIC MEMORY DEVICES

TECHNICAL FIELD

The subject innovation relates generally to computer/device memory controllers, methods, and/or systems and more particularly to computer/device random access memories, controllers, methods, and/or systems for enablement of Physical Block Addressing System (PBASYS) in computer/device random access memories.

BACKGROUND

Traditionally, data access related to a memory device (e.g., a flash memory device, among others) can be implemented by employing a Logical Block Addressing System (LBASYS) to facilitate access to data. In a LBASYS enabled memory device, a logical block address (LBA) typically can be logically related to a physical block address (PBA). The use of a LBA enables access to a PBA through translation of the "physical" storage location address to, or from, a "logical" storage location address as is well known in the art. Thus, an address translation component (e.g., an address translation process, controller, . . . ) can associate dynamically changing PBAs with a more static LBA. This enables hiding some of the complexities of wear leveling, bad erase block management (BBM), or memory data access (e.g., read, write, erase, . . . ) at the user side of a LBASYS interface by obfuscating a changing PBA behind a more static LBA.

Historically, the LBASYS developed in response to traditional electromechanical memory systems (e.g., the increasing capacity of physical disk drive systems in computer systems) becoming very large. In order to address these large drives within the existing operating system memory addressing limitations, multiple logical drives were implemented on single physical drives. Thus, the LBASYS became an ad hoc industry standard and after arriving technologies implemented the LBASYS even where newer operating systems could operate without them. This legacy LBASYS also was applied to later arriving non-electromechanical memory systems. For example, it has been common practice to employ LBASYS in NOR and NAND flash memories, among others. Employing a legacy LBASYS however has conventionally increased the time to access data on a memory device because of the need to translate between a LBA and a PBA when accessing memory.

Generally, information can be stored and maintained in one or more of a number of types of storage devices, such as memory devices. Memory devices can be subdivided into volatile and non-volatile types. Volatile memory devices generally lose their information if they lose power and typically require periodic refresh cycles to maintain their information. Volatile memory devices include, for example, random access memory (RAM), dynamic RAM (DRAM), static RAM (SRAM), and the like. Non-volatile memory devices can maintain their information whether or not power is maintained to the memory devices. Non-volatile memory devices include, but are not limited to, flash memory, read only memory (ROM), programmable ROM (PROM), erasable PROM (EPROM), electrically erasable PROM (EEPROM), non-volatile RAM, and the like.

The memory cells of a memory device can typically be arranged in an array. A memory cell can be placed at each intersecting row and column in the array. Typically, a particular memory cell can be accessed by activating its row and then writing the state of its column or reading the state of the memory cell. Memory sizes can be defined by the row and column architecture. For example, a 1024 row by 1024 column memory array can define a memory device having one megabit of memory cells. The array rows can be referred to as wordlines and the array columns can be referred to as bitlines.

In memory cells, one or more bits of data can be stored in (e.g., a write) and read (e.g., a read) from respective memory cells. Additionally, one or more bits of data can be erased from (e.g., erase) respective memory cells or blocks of cells (e.g., erase block). The basic memory operations (e.g., read, write, erase, . . . ) to access memory cells and data associated therewith can be commonly performed by application of appropriate voltages to certain terminals of the memory cells. In a read or write operation the voltages can be applied so as to cause a charge to be removed, stored, or sensed in/from a charge storage layer of the memory cell. Further, higher level memory operations can comprise a plurality of basic memory operations to facilitate more complex data access (e.g., a data compaction operation can comprise reading the data from a series of data locations (e.g., reading a plurality of data locations in a data page or erase block) and writing select portions of the read data to a new data location (e.g., writing a plurality of data locations in a new page or new erase block) to store only still relevant data; a garbage collection operation can comprise a data compaction operation followed by erasing data from the old collection of data locations (e.g., erasing a plurality of data locations in the old page or old erase block) to free that space for other data access operations, among others).

The use of portable computer and electronic devices has greatly increased demand for high memory capacity, efficient and reliable memory devices. Digital cameras, digital audio players, personal digital assistants, and the like, generally seek to employ large capacity memory devices (e.g., flash memory, smart media, or compact flash, among others). Many modern computer based devices employ electronic memory devices in which asymmetric data access is typical, for example, in some computing environments read operations occur more frequently than write operations. Where memory operations are asymmetric, direct access to a PBA can decrease data access times in comparison to a LBASYS because time (e.g., computing cycles) to translate between a LBA and a PBA can be eliminated in the data access operation (e.g., read, write, . . . ). Faster access times can translate into higher data throughput in memory devices and improved performance for an end user device.

It is desirable to improve data access performance associated with memory devices. It is also desirable to reduce the amount of time associated with locating a physical memory location to facilitate improved data access performance, while achieving a user-friendly interface.

SUMMARY

The following presents a simplified summary of the subject innovation in order to provide a basic understanding of some aspects described herein. This summary is not an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

In accordance with one aspect of the disclosed subject matter, a memory component (e.g., flash memory, among others) can be comprised of a plurality of memory locations (e.g., memory cells) in which data can be accessed (e.g., read, written, refreshed, erased, . . . ). In an aspect, the memory locations can each be comprised of various semiconductor layers (e.g., oxide layer(s), silicon-rich/-poor silicon-nitrite layer(s), polysilicon layer(s), metal/metalized layer(s), among others) that can facilitate trapping and storing electron charges in the memory location, where the amount of stored charge in the memory location can represent and correspond to a data value of the data being accessed (e.g., written, read, refreshed, erased, . . . ) in the memory location. The memory component can include a predetermined number of sectors or blocks that can each include a subset of memory locations. The memory locations can be accessed (e.g., read, write, refresh, erase, . . . ) by applying predetermined voltage levels related to the particular memory operation to respective data access lines (e.g., bitlines) and access enable lines (e.g., wordlines) that can be associated therewith and/or predetermined voltage levels to a substrate associated therewith. A buffer memory can be employed to facilitate accessing data in the plurality of memory locations.

In accordance with an aspect of the disclosed subject matter, a memory component can comprise, for example, a core memory component (core), a buffer memory component (buffer), and a file management component (FMC), among others. A core can be used to store and/or retrieve data communicated to/from a memory component through an I/O component. The buffer can facilitate accessing data (e.g., read, write, refresh, erase, . . . ) during memory operations (e.g., read, write, refresh, erase, . . . ) between the core and the I/O component, for example, the buffer component can be employed to prevent over or under runs during a write operation to the memory core component. The FMC can facilitate addressing and management of data storage locations within the core.

In accordance with another aspect of the disclosed subject matter, the FMC can include a file table component (FTC) that can be employed to facilitate tabular management of the data access locations (e.g., a file table) by, for example, storing a filename and plurality of related physical block addresses (PBAs), among others. Further, the FMC can include a logical block addressing system (LBASYS) to provide backward compatibility, mixed mode operation (e.g., mixed PBA and LBA addressing based at least in part on the types of data access operations being conducted), or complementary mode operation (e.g., a LBASYS may be employed for select data access operations and then LBAs can be translated to a FTC to facilitate select data operations that are faster in PBA mode), among others.

Conventionally, LBASYS memory access requires translation between a PBA and a LBA as part of the memory access operation. Translation between a PBA and LBA typically increases data access times. In an aspect the subject innovation can employ a physical block address system (PBASYS) to avoid the need to translate between a PBA and a LBA. This can be especially advantageous where asymmetric data access occurs. In light of the near ubiquitous use of a LBASYS in computer-based products, the subject innovation in another aspect can include support for a LBASYS, in addition to supporting a PBASYS, to facilitate reduced data access times. Further, data access through use of a PBASYS can be facilitated by employing a PBA File System (PBAFS) and a PBA Block Driver (PBABD) in a tightly coupled embedded system (TCES).

To the accomplishment of the foregoing and related ends, the innovation, then, comprises the features hereinafter fully described and particularly pointed out in the claims. The following description and the annexed drawings set forth in detail certain illustrative embodiments of the innovation. These embodiments can be indicative, however, of but a few of the various ways in which the principles of the innovation can be employed. Other objects, advantages, and novel features of the innovation will become apparent from the following detailed description of the innovation when considered in conjunction with the drawings.

DETAILED DESCRIPTION

Figure 1:
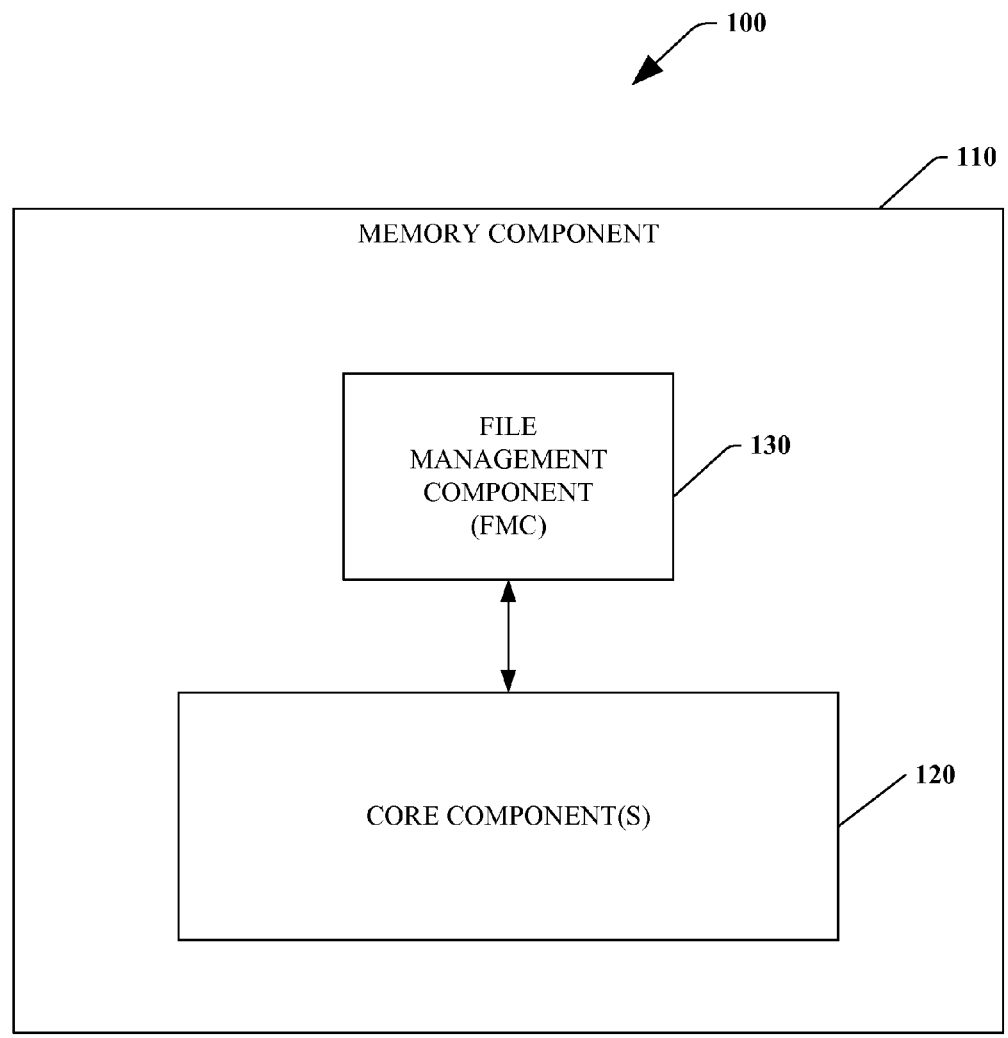
FIG. 1 is a high level diagram of a system that can facilitate storage and/or access of data associated with a memory in accordance with an aspect of the subject matter disclosed herein.

The disclosed subject matter is described with reference to the drawings, wherein like reference numerals are used to refer to like elements throughout. In the following description, for purposes of explanation, numerous specific details are set forth in order to provide a thorough understanding of the subject innovation. It is evident, however, that the disclosed subject matter can be practiced without these specific details. In other instances, well-known structures and devices are shown in block diagram form in order to facilitate describing the subject innovation.

Traditionally, electronic memory devices rely on Logical Block Addressing for data access (e.g., read, write, erase, . . . ). Logical Block Addressing requires translation from the Logical Block Address (LBA) to a Physical Block Address (PBA) to access data at a memory location. The process of LBA to PBA translation can be time consuming and reduce overall memory device performance. Logical Block Addressing historically was developed to accommodate larger electromechanical memory device volumes than could be accommodated with operating system programming designs of the period. Thus, where Logical Block Addressing is not needed in electronic memory devices, it can be more efficient to employ direct Physical Block Addressing when accessing memory because time is not wasted in converting between LBAs and PBAs. Further, where asymmetric data access (e.g., read operations occur more frequently than write or reclaim operations) occurs, a PBA system can have a more pronounced performance benefit.

A PBA system (PBASYS) manages the access of data in a memory (e.g., read, write, erase, reclaim, . . . ) by management of the physical block address associated with data. In comparison a LBA system (LBASYS) manages both a physical and a logical block address associated with data and further can provide translation between the LBA and PBA when accessing said data. While a LBASYS provides more static logical addresses for data from the user side (e.g., changes in the PBA are mapped to a relatively static LBA), this comes at additional temporal expense due to the need to translate between and LBA and PBA. In comparison, where a PBASYS is employed, changes to the physical address can be updated directly facilitating faster data access at the cost of maintaining a more static address from the user side. However, where a more static address is of low priority to the user, the increased speed of a PBASYS can be a more attractive solution to data access on electronic memory devices.

In one aspect, the more frequent changes to a PBA in a PBASYS (as compared to a LBA in a LBASYS) can be managed by tightly coupled embedded systems (TCES) such as, for example, an embedded PBA file system component and a PBA block driver component designed to facilitate updates of a PBA based file table component (FTC) either with or without a FTC update component. Such an exemplary TCES can be specifically designed to facilitate a PBASYS by providing an interface for computer-based devices that is user friendly and accommodates physical block addressing for data access in electronic memory devices. Further, where asymmetric data access occurs, for example, a stored telephone number in a cell phone is typically read out much more often than it is edited or moved to a different memory location, the PBA can remain relatively static similar to a LBA. However, the relatively static PBA does not need to be translated like a LBA and thus can result in faster data access times. Therefore, where asymmetric data access occurs the benefits of a PBASYS become even more attractive.

The subject innovation is hereinafter illustrated with respect to one or more arbitrary architectures for performing the disclosed subject matter. However, it will be appreciated by one of skill in the art that one or more aspects of the subject innovation can be employed in other memory system architectures and is not limited to the examples herein presented.

Turning to FIG. 1, illustrated is a high level diagram of a system 100 that can facilitate storage and/or access of data associated with a memory in accordance with an aspect of the subject matter disclosed herein. System 100, for example, can include a memory component 110 (e.g., memory card, flash drive, SIM card, . . . ). Memory component 110 can include a core component(s) 120 (e.g., an array of core memory cells, address decoders, drive transistors, . . . ) and buffer components (not shown) to facilitate data access associated with the memory component 110. The core component(s) 120 can include a plurality of volatile and/or nonvolatile memory locations (e.g., flash memory, SRAMs, DRAMS, EEPROMs, . . . ) having physical block addresses associated therewith.

Generally, a nonvolatile memory can include, for example, flash memory (e.g., single-bit flash memory, multi-bit flash memory), mask-programmed ROM, programmable ROM (PROM), Erasable PROM (EPROM), Ultra Violet (UV)-erase EPROM, one-time programmable ROM, electrically erasable PROM (EEPROM), nonvolatile random access memory (NVRAM) (e.g., ferroelectric random access memory (FeRAM), magnetoresistive random access memory (MRAM)), or combinations thereof, among others. Generally a volatile memory can include, for example, random access memory (RAM), dynamic RAM (DRAM), static RAM (SRAM), or combinations thereof, among others.

Figure 2:
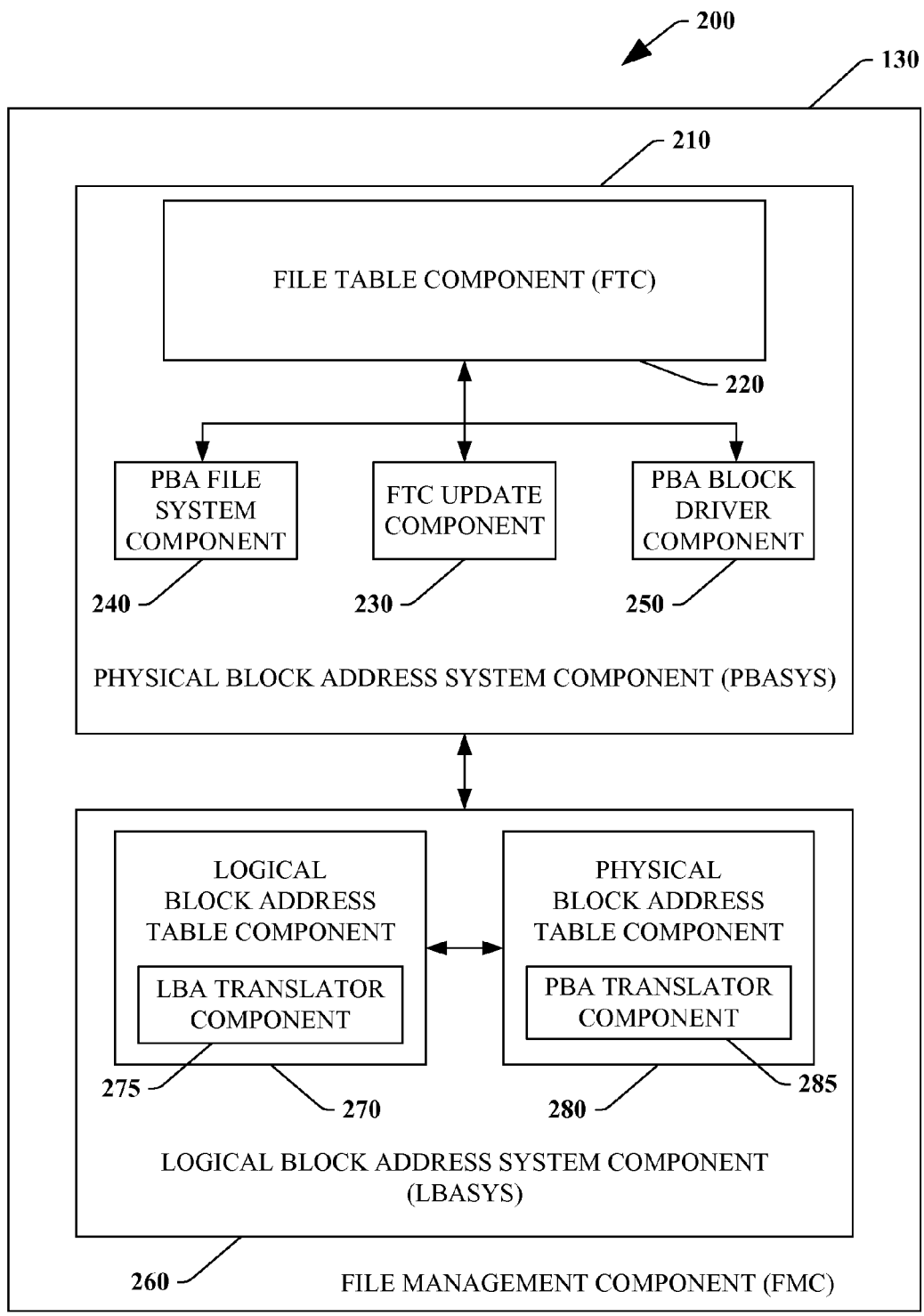
FIG. 2 is a diagram of a file management component that can facilitate storage and/or access of data associated with a memory in accordance with an aspect of the subject matter disclosed herein.

Further in accord with the disclosed subject matter, the memory component 110 can include a file management component (FMC) 130 that can facilitate accessing data (e.g., read, write, erase, . . . ) on the core component(s) 120. The FMC 130 can include a physical block address system (PBASYS) component (e.g., PBASYS 210, as illustrated in FIG. 2 and described herein) to facilitate accessing blocks of memory associated with PBAs. The FMC 130 can further include a logical block address system (LBASYS) component (e.g., LBASYS 260, as illustrated in FIG. 2 and described herein) in combination with the PBASYS component to facilitate backwards compatibility and support of legacy LBA systems.

An exemplary LBASYS can involve a time consuming process to map or translate between PBAs and LBAs when data is accessed. For example, in a conventional LBASYS, a LBA file management table can contain filenames and LBAs related to the data constituting the file referenced by the filename. The LBASYS can also contain, for example, a PBA file management table, an additional set of data in the LBA file table relating to PBAs, or other records of the PBAs related to the data constituting the file referenced by the filename. When data is accessed, for example in a read operation, the requested filename can be searched for in the LBA file management table. If the filename is located, the LBAs related to the data constituting the file referenced by the filename can be returned. Next, the returned LBAs can be translated into the PBAs, for example, by using the LBAs to look up PBAs on the PBA file management table or using the LBAs to access the related PBAs in the LBA file management table, among others. The PBAs can then facilitate accessing the requested data associated with the filename passed in when the read operation began. This data can then be passed back to the requesting user. Numerous actions are needed to translate between the LBAs and PBAs to access the data for the requested filename.

Similarly, the LBASYS in, for example, a write operation would receive a filename and set of data to be stored. The LBASYS would then add the filename (assuming a new file as compared to an updating operation) to the LBA file management table. A set of LBAs can then be associated with the filename. Data can then be written to memory locations having PBAs. These PBAs can then be associated with the LBAs either as additional data in the LBA file management table or as a mapped PBA file management table. When data is moved to a new physical memory location, for example when reclaiming a data page in a flash memory, as part of a write operation, the existing LBA to PBA tuple must be updated in the LBA file management table or mapped PBA file management table. Similarly, when erasing an erase block, for example when reclaiming an erase block containing valid data pages during an idle period, valid data can be moved requiring the updating of the LBA to PBA tuple in the LBA file management table or mapped PBA file management table. Again, the translation between LBAs and PBAs can consume valuable time.

Employing a PBASYS can improve data access time by eliminating the need to translate between a LBA and a PBA when accessing data. In an exemplary system 100 employing a PBASYS, the physical block addresses can be updated as data is written (e.g., new data written or old data moved to a new physical location during a memory operation). This can keep a PBA file management table up to date. When a read operation is started, a filename can be searched for in the PBA file management table and if found the PBAs can be returned directly to facilitate accessing the data at those physical blocks associated with the date constituting the file requested. Also, when a write data operation is started, a filename can be added to the PBA file management table. Data can then be written and the PBAs can be directly associated with the filename in the PBA file management table. Similarly, when updating or reclaiming, data moved to new physical locations can have their respective PBAs directly updated in the PBA file management table.

When data is frequently moved or written among different physical memory locations, a relatively static LBA table can obfuscate the changing PBAs by abstracting them into LBAs. However, this can reduce data access speeds as herein above discussed. In both an LBASYS and a PBASYS, when data is moved or written, a file management table is typically updated, thus both systems execute this portion of data access with little difference in access time. However, when data is read and an update of a file management table would not be needed, the PBASYS can outperform the LBASYS because the translation between PBA and LBA is avoided. Thus, as the proportion of read operations to write operations increases (e.g., where reads far outnumber writes) the performance of a PBASYS can similarly improve the performance of a memory device in comparison to an LBASYS. Therefore asymmetric data access performance can be dramatically improved when employing a PBASYS.

In extremely asymmetric data access systems, such as, a write-once/read-many system or a content delivery system, among others, the benefits of a PBASYS over and LBASYS can be substantial as herein discussed. As an example, a user can write music files to a flash memory that can then be read frequently and further writes are relatively infrequent (e.g., writes can occur when music files are swapped out for new music, among others). An additional example can be commercially written data, such as electronic books or pre-written music files available on discrete media (e.g., commercially produced books or albums on discrete media such as flash memory, among others), in which the user can read the data numerous times and can be prevented from ever writing to the media (e.g., a read only PBASYS application). A further example can be user archives of data or documents that are expressly used for review (e.g., archives of scanned documents, among others). In each of these extremely asymmetric data access systems the user can enjoy far improved access times with PBASYS over a conventional LBASYS because for each data access translation from LBAs to PBAs can be avoided. Further, there is little benefit to maintaining a logical file management table because data is rarely being moved and/or written. Thus, in extremely asymmetric data access systems employing a PBASYS can be highly efficacious.

Referring now to FIG. 2, illustrated is a diagram of a file management component system 200 that can facilitate storage and/or access of data associated with a memory in accordance with an aspect of the subject matter disclosed herein. In the system 200, the file management component (FMC) 130 can include a physical block address system (PBASYS) component 210 as herein above described to facilitate accessing data by employing physical block addresses (PBAs). The PBASYS component 210 can further include a file table component (FTC) 220 that can facilitate storing file table(s) that can include, among others, filenames and PBAs addressing data associated with the file named. A file table can be in tabular form or can be in another form that correlates a PBA(s) with a named file, for example, a linked list(s), data structure(s), or hash table encoding, among others.

In one aspect, one or more file tables can be included in the FTC 220, and the file table(s) can include filenames and a plurality of PBAs that map out the storage of file data elements (e.g., word or bit length file data segments) in various contiguous or non-contiguous memory locations in, for example, a core memory (e.g., core component(s) 120, as depicted in FIG. 1 and described herein). By relating PBAs to the locations of data in a memory (e.g., memory component 110, as illustrated in FIG. 1 and described herein), the FTC 210 can facilitate data access (e.g., read, write, erase, update, . . . ). Further, by relating PBAs, instead of LBAs or both PBAs and LBAs, the FTC can facilitate faster data access where avoiding translation between LBAs and PBAs can reduce data access times.

The PBASYS component 210 can further include a FTC update component 230 that can facilitate updating the file table(s) in FTC 210. The FTC update component 230 can determine filename locations within the FTC 220, determine what PBAs are associated with filename locations within the FTC 220, determine which PBAs to update and what values to update them with, can infer when and how to execute background operations (e.g., reclaim operations, garbage collection operations, wear leveling, bad erase block management operations, . . . ) within the FTC 210, or combinations thereof, among others. One of skill in the art will appreciate that the FTC update component 230 can be a component of the PBASYS component 210 or can be a separate component located elsewhere, for example, in system 200. Further, one of skill in the art will appreciate that aspects of the FTC update component 230 can be spread among various other components to achieve similar results, for example, some features can be located in the FTC 220 while other features can be located within an external FTC update component 230.

In accordance with another aspect, a tightly coupled embedded system (TCES) (not illustrated) can be employed to facilitate PBA input/output functions with a user device (e.g., cellular phone, personal digital assistant (PDA), etc.), and the PBASYS component 210 can further include a PBA file system component 240, a PBA block driver component 250, or combinations thereof, among others. The PBS file system component 240 can facilitate data access in a PBASYS by, for example, defining an I/O protocol employing PBAs. This can enable a user device to communicate with a memory component 110 in an optimal manner to reduce, for example, erase or write interrupts, redundant reclaim operations, or non-optimal use of idle time among others. The PBA block driver component 250 can facilitate accessing data by, for example, defining write block cluster sizes, erase block sizes, timing protocols, and/or optimization of available physical memory space, among others. One of skill in the art will appreciate that either or both the PBA file system component 240 and the PBA block driver component 250 can be included in the PBASYS component 210 or can be located elsewhere, for example, they can be included in a user device (not shown). It will be further appreciated that functional aspects or either or both the PBA file system component 240 and the PBA block driver component 250 can be distributed among other components of system 200. By using a TCES, the development of user devices employing a PBASYS can be facilitated.

The FMC 130 can further include a LBASYS component 260 to facilitate backwards compatibility with legacy LBA systems. This can allow a PBASYS enabled memory device to remain useable on non-PBASYS enabled user devices included in system 100. The LBASYS component 260 can include a LBA table component 270 and LBA translator component 275 to facilitate storing and/or accessing LBAs. Further, the LBASYS component 260 can include a PBA table component 280 and PBA translator component 285 to facilitate storing and/or accessing PBAs that relate to the LBAs of LBA table component 270. Thus, the LBASYS component can serve to function similar to existing LBA systems.

One of skill in the art will appreciate that the LBASYS component 260 can optionally employ the FTC 220 of PBASYS component 210 as a functional surrogate of the PBA table component 280 where the LBA translator component 275 can facilitate all necessary translations between a LBA (at 270) and a PBA (at 220). Where FTC 220 acts as the PBA table component 280, a separate PBA table component 280 can be absent. Moreover, where LBA table component 270 includes both the LBA and PBA locations related to a file and the LBA translator component 275 can facilitate all necessary translations between a LBA and a PBA thereon, PBA table component 280 can be absent.

In one embodiment, a LBASYS component 260 can be included in a FMC 210, and the LBASYS component 260 and the PBASYS component 210 can, in addition to merely adding backwards compatibility to LBA devices, allow mixed mode or complementary mode operations. By mixed mode operations, it is meant that redundant addressing can be employed (e.g., the PBA table in FTC 220 can contain the same information as the PBA table in PBA table component 280 (which can be mapped to/from the LBA data in LBA table component 270)) to allow a device to be transferred between a PBASYS enabled device and a non-PBASYS enabled device and enabling identical data access on either device. By complementary mode operations, it is meant that where the memory device is being employed in write and erase intensive conditions the LBASYS can be employed and, as device conditions change to a read intensive environment, the PBASYS can be employed to facilitate faster data access. Legacy LBA mode, mixed mode, and complementary mode can be further facilitated by employing an inferential component (not illustrated) to aid in determination of the optimum deployment of these additional modes of operation.

Figure 3:
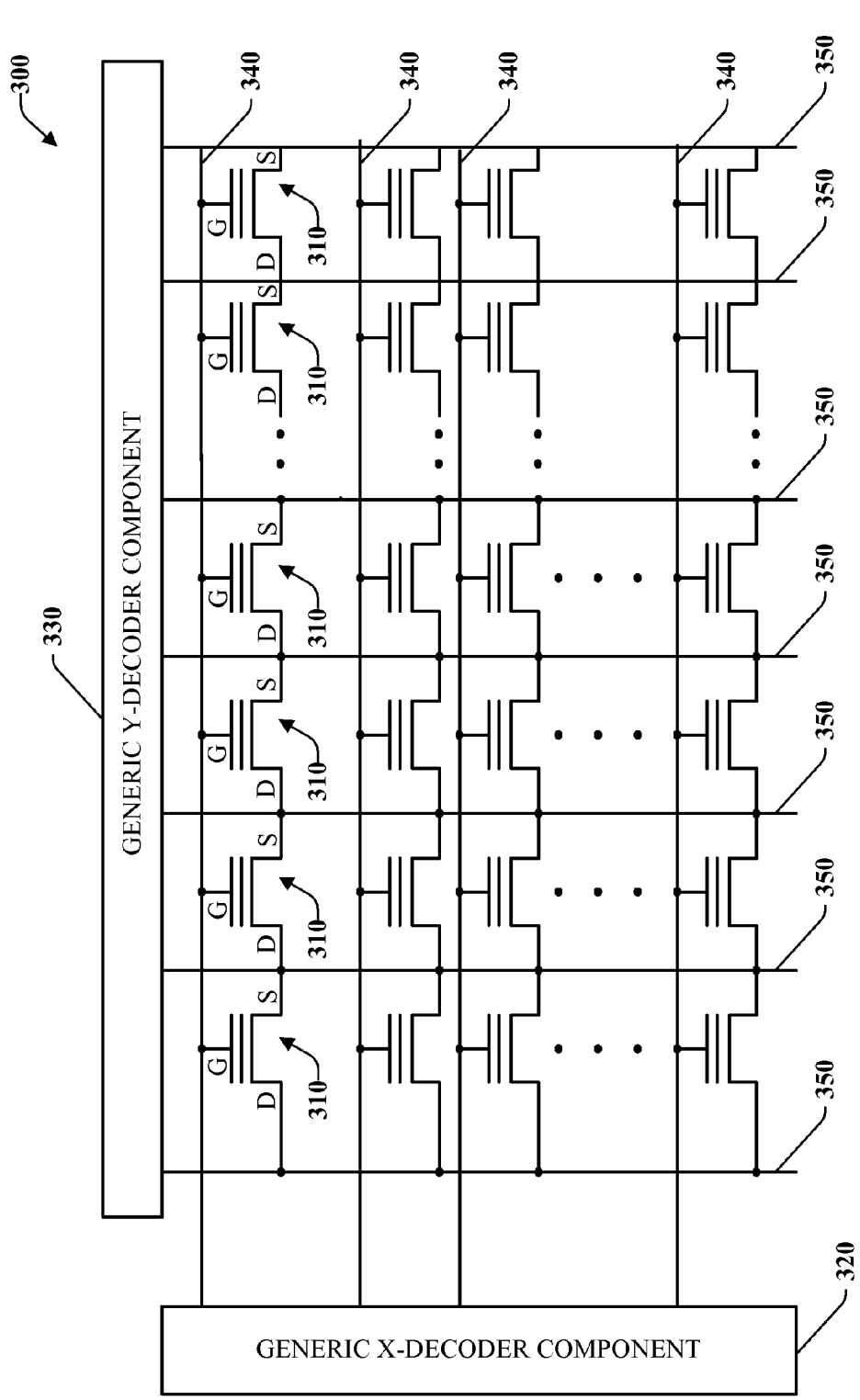
FIG. 3 is a simplified schematic diagram of a generic array of memory cells associated with a generic memory in accordance with an aspect of the subject matter disclosed herein.

Turning to FIG. 3, depicted is a schematic diagram of a portion of a generic memory array 300 that can facilitate data storage and/or access in accordance with an aspect of the disclosed subject matter. The generic memory array 300 can include an array of generic memory cells 310 (e.g., adapted to core cells, adapted to buffer cells, . . . ) that can comprise a plurality of transistors. While only a single transistor is illustrated as representative of a generic memory cell 310, the generic memory cell can comprise a plurality of transistors for each cell, for example, a six transistor SRAM cell, among others. Transistors in a generic memory 310 cell can each be comprised of a drain (D), gate (G), and source (S) and be interconnected as is well known in the art to produce an appropriate type of memory cell for the application selected. Memory cell layout can include NAND and NOR designs among others. In accordance with an aspect, one or more bits of data can be stored in each generic memory cell 310. In accordance with another aspect, each generic memory cell 310 can be a multi-level cell, where data can be represented by a level of charge stored within the memory cell 310.

The generic memory array 300 can include a generic X-decoder component 320 (e.g., word line decoder) and a generic Y-decoder component 330 (e.g., bitline decoder) that can each respectively decode inputs/outputs during various memory operations (e.g., writing, reading, refreshing, erasing, . . . ) that can be performed on the generic memory cells 310, to facilitate storage and/or access of data. The generic X-decoder component 320 and generic Y-decoder component 330 can each receive address bus information, for example, from a host processor (not shown) and/or system controller (not shown), or the like, and can utilize such information to facilitate accessing or selecting generic memory cell(s) 310 (e.g., memory location(s)) associated with the memory operation. The generic memory array 300 can be adapted to facilitate a broad plurality of memory applications. For example, where generic memory component 300 is adapted to a core component 120 (as depicted in FIG. 1 and described herein, the generic X-decoder 320 can be adapted to be a core X-decoder (not shown), the generic Y-decoder 330 can be adapted to be a core Y-decoder (not shown), and the generic memory cells 310 can be adapted to be core memory cells (not shown). In accordance with one aspect, the generic X-decoder 320 and generic Y-decoder 330 each can be tree-type decoders.

The generic memory cells 310 can be formed in rows and columns. A common wordline 340 can be, for example, commonly coupled to the control gate (G) of each memory cell 310 in a row to control when the generic memory cells 310 in that row can be conductively coupled to the bitline columns as is well known in the art. Further, for example, a common bitline 350 can be commonly coupled to each generic memory cell 310 in a column and can be selectively conductively coupled to the generic memory cell 310 by the common wordline 340 as is well known in the art. Further, each common bitline 350 can also comprise a plurality of data access lines (e.g., bitline and bitlinebar for memory operations on a SRAMs type memory cell, among others) and these can be connected in series or parallel, among others. In accordance with an aspect of the disclosed subject matter, respective charge potentials can be applied to one or more memory cells 310 through the common wordlines 340 and common bitlines 350 to facilitate performing memory operations, such as write, read, refresh, erase, and the like.

It is to be appreciated that while the generic memory cells 310 are shown as being respectively associated with a drain and a source, in accordance with one embodiment, where a generic memory cell 310 contains charge storage components on two sides of the generic memory cell 310 that can each be programmed with data (e.g., charge stored therein), the drain can act as the source, and/or the source can act as the drain, depending on which charge storage component of the generic memory cell 310 is being charged during a given memory operation.

Figure 4:
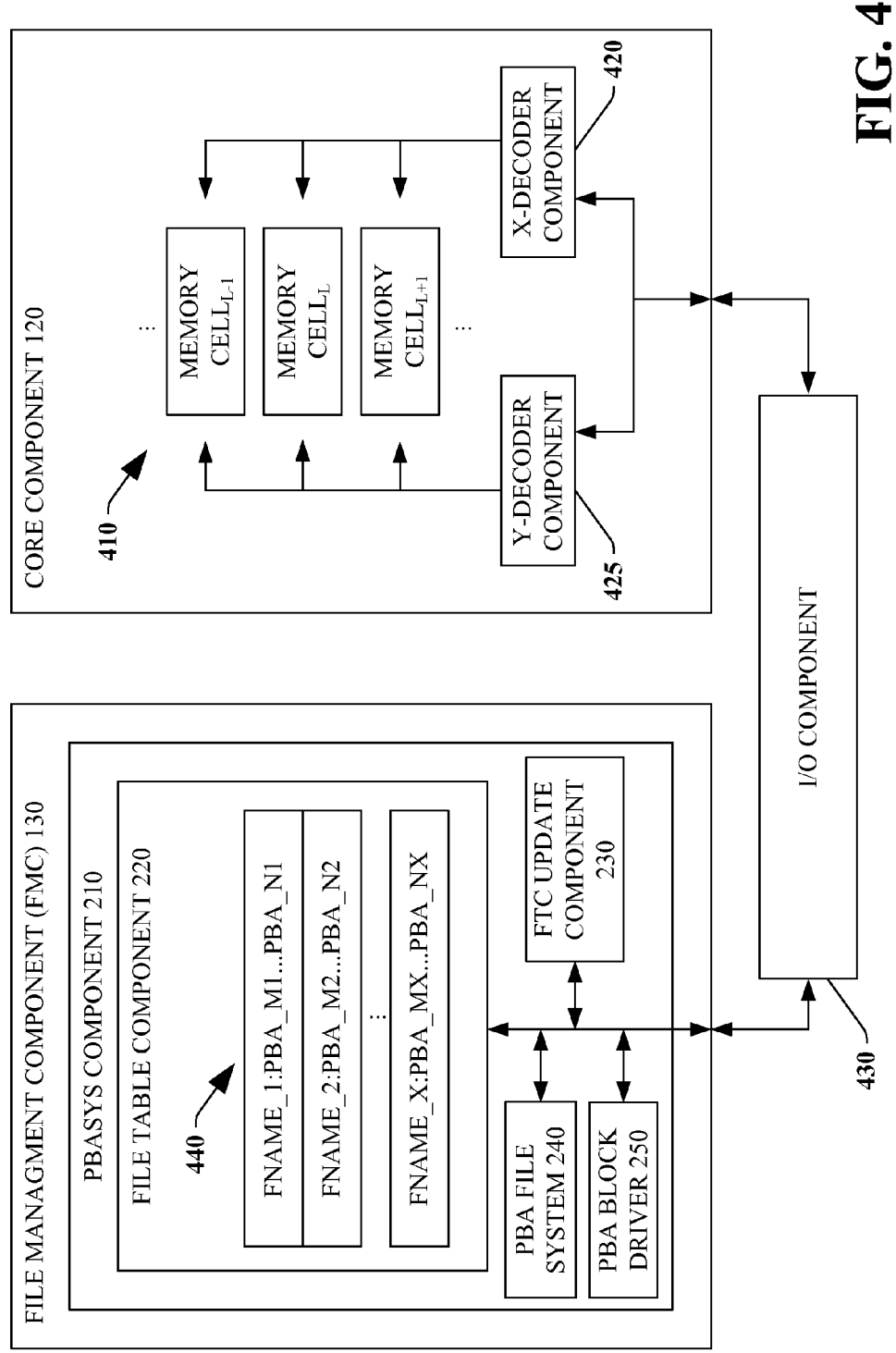
FIG. 4 illustrates a diagram of a system employing physical block addressing to facilitate storage and/or access to data associated with a memory in accordance with an aspect of the disclosed subject matter.

Referring now to FIG. 4, illustrated is a diagram of a system 400 employing physical block addressing to facilitate storage and/or access to data associated with a memory (e.g., memory component 110) in accordance with an aspect of the disclosed subject matter. A core component 120 can, for example, include an array of memory cells 410 (e.g., . . . , memory cell$_{L-1}$, memory cell$_L$, memory cell$_{L+1}$, . . . ). These memory cells can be addresses, for example, by an X decoder component 420 and Y decoder component 425 to facilitate accessing data (e.g., reading, writing, erasing, . . . ) at one or more of the memory cells in array 410. An I/O component 430 may be communicatively coupled to the core component 120 to facilitate data access at the memory cell array 410. Further, a buffer component (not shown) can be employed to facilitate data access associated with the memory (e.g., memory component 110, as illustrated in FIG. 1 and described herein).

The I/O component 430 can also be communicatively coupled with the file management component 130. The file management component can include a PBASYS component 210 which can include a FTC update component 230, a PBA file system component 240, and/or a PBA block driver component 250, among others, as discussed herein. The PBASYS component 210 can facilitate addressing physical memory locations (e.g., memory cell array 410) by employing PBAs. The PBASYS component 210 can to this end include a file table component 220 that can store file and data relationships, for example an array or table of filenames and PBA tuples 440 (e.g., FNAME_X:PBA_MX . . . PBANX wherein M, N, and X are integers and a plurality of PBAs (e.g., PBA_M to PBA_N as related to filename FNAME_X) representing a contiguous or non-contiguous physical memory space can be associated with a single filename (FNAME_X)). One of skill in the art will appreciate that a nearly limitless variety of data structures can be employed to facilitate storing PBA data related to physical memory locations (e.g., memory cell array 410) and associate the PBA data to a filename, and will further appreciate that all such arrangements are within the scope of the disclosed subject matter.

As an example, where a read operation is initiated, a read request and filename, for example FNAME_2, can be passed through I/O component 430 to the FMC 130. At the FMC 130, the request can be analyzed by the PBA file system 240 and PBA block driver 250 of PBASYS component 210. The analyzed request can cause the FTC 220 to search a file table 440 for the requested filename. If FNAME_2 is located in the file table 440, the FTC 220 can return the associated PBAs. These PBAs can be decoded by the X decoder and Y decoder component, 420 and 425 respectively, such that the correct memory locations in the memory array 410 are accessed and their data returned through the I/O component 430.

FIGS. 5-10 illustrate methodologies, flow diagrams, and/or timing diagrams in accordance with the disclosed subject matter. It is to be appreciated that the methodologies presented herein can incorporate actions pertaining to a neural network, an expert system, a fuzzy logic system, and/or a data fusion component, or a combination of these, which can generate diagnostics indicative of the optimization of memory operations germane to the disclosed methodologies. Further, the prognostic analysis of this data can serve to better optimize memory operations, and can be based on real time acquired data or historical data within a methodology or from components related to a methodology herein disclosed, among others. It is to be appreciated that the subject invention can employ highly sophisticated diagnostic and prognostic data gathering, generation and analysis techniques, and such should not be confused with trivial techniques such as mere temporally scheduled reclaim command operations.

For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states by way of a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 5:
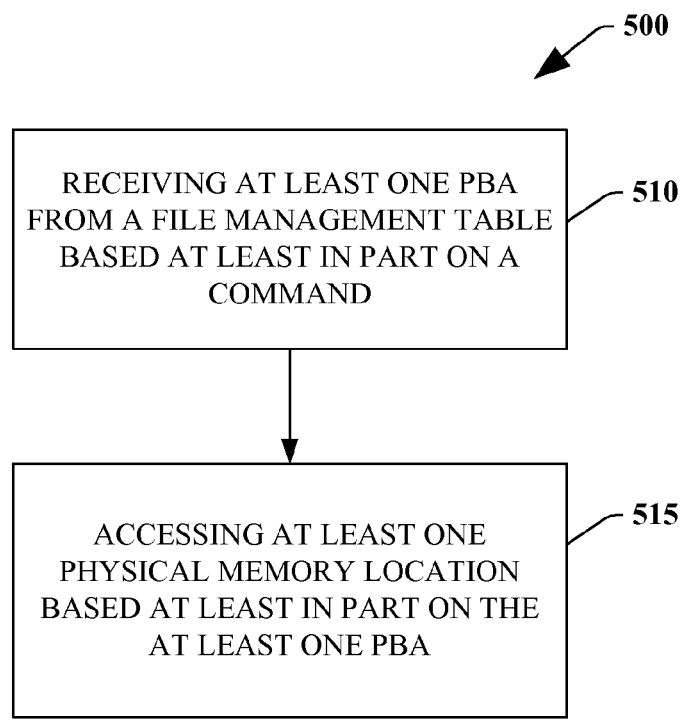
FIG. 5 illustrates a methodology that facilitates accessing data associated with a memory in accordance with an aspect of the disclosed subject matter.

Referring now to FIG. 5, illustrated is a methodology 500 that facilitates storing and/or accessing data associated with a memory (e.g., memory component 110) in accordance with an aspect of the disclosed subject matter. The methodology 500 can facilitate accessing data without employing LBAs in PBASYS enabled systems, such as system 100. Further, the methodology 500 can facilitate accessing data by employing LBA to PBA translation as is known in the art to support legacy LBASYS systems. Moreover, the methodology 500 can facilitate mixed mode and complementary mode data access as described herein above.

Conventionally, a method of accessing data in a non-PBASYS enabled device can additionally include receiving at least one LBA from a file management table based at least in part on a command. Further, the conventional method can include looking up the LBAs or mathematically converting the LBAs to generate or return PBAs (e.g., the PBA can only be accessed by translating the first acquired LBAs) before the PBAs can be employed. After the PBAs are received (e.g., post-LBA translation) the PBAs can be employed to access the physical memory locations. Thus, the conventional method can be substantially more computationally complex and time consuming than the subject innovation.

At 510, a PBA(s) can be received from a file management table based at least in part on a command. In one aspect, the PBA(s) can be stored in, for example a file table, and can be related to a set of data, for example, a plurality of datum that together constitute a file represented by a filename. The file table can be searched for the filename and the PBAs stored in the file table relating to the filename can be returned in response to a command. A command can be a memory operation command, for example, read, write, reclaim, refresh, update, erase, and the like. Further, based at least in part on this command, a PBASYS enabled system can cause a search of a file management table to return at least one PBA related to the command. For example, a file table (among other PBA(s) reference systems) can be searched to determine a set of valid data PBA locations (e.g., PBA(s) associated with data that is part of a file). These valid data PBA(s) can then be compacted (e.g., by moving datum to new PBAs and updating the file table with the new PBAs, similar to a defragment) allowing other PBAs to be erased for reuse by the memory system 100 in response to a command, such as reclaim command. A second example can be for example, if a read command is given, a filename can be provided to the file management table for searching. If the filename is found in the file management table, the PBAs associated with the physical memory locations storing data related to the file sought can be returned directly (e.g., without LBA to PBA translation).

At 515, the received at least one PBA can be used to facilitate accessing at least one physical memory location based at least in part on the one or more PBAs. In an aspect, the received PBA can facilitate direct access of data stored at a physical memory location (e.g., at a memory cell, for example, a memory cell in array 410, see FIG. 4). This can be accomplished by, for example, decoding the PBAs to access particular memory cells in, for example, a memory cell array 410 in core component(s) 120 as shown in FIG. 4. Where, for example, a read command has returned a plurality of PBAs associated with file data for a target filename, the PBAs can facilitate accessing the correct physical memory cell locations to read the file data out to the system 100.

In accordance with another aspect of the subject innovation, where a file management component 130, as illustrated in FIG. 2, includes a LBASYS component 260, LBAs can be translated into PBAs to facilitate method 500 in non-PBA-SYS enabled devices to allow backwards compatibility. In addition, both direct PBA access from a file table component (e.g., FTC 220) and translated LBA to PBA access from a LBASYS component (e.g., LBASYS component 260) can be used to facilitate methodology 500 where mixed mode and/or complementary mode data access is employed, as discussed herein, for example, with regard to FIG. 2. At this point, methodology 500 can end.

Figure 6:
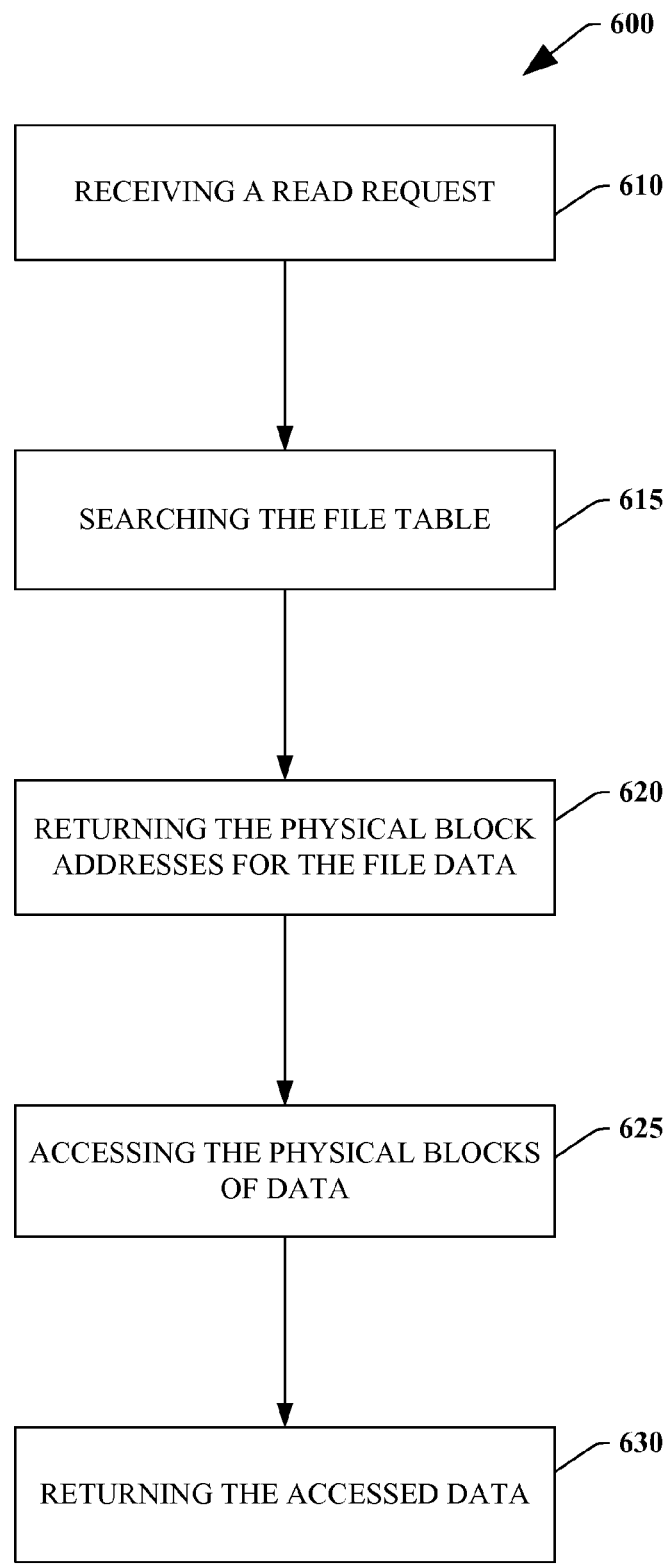
FIG. 6 illustrates a methodology that facilitates storing data associated with a memory in accordance with an aspect of the disclosed subject matter.

Referring now to FIG. 6, illustrated is a methodology 600 that facilitates accessing data associated with a memory in accordance with an aspect of the disclosed subject matter. At 610, a read request command can be received. For example, a read command can be generated in system 100 and passed to the file management component 130 to read file data from core component 120. The read request can include a filename specifying the file to be read. At 615, the filename can be employed in searching a store of PBAs. For example, a filename can be used to search a file table of PBAs related to filenames (e.g., PBAs can represent the physical memory locations in which file data is stored, thus where a filename is searched for in a file table, the filename can have PBAs associated therewith that contain the physical locations of the data associated with the file represented by the filename). PBAs can be stored and related to files in nearly limitless ways, as will be appreciated by one of skill in the art, when a file table is employed, the file table can be, for example, an array of filenames and PBA tuples 440 as illustrated in FIG. 4.

At 620, PBA(s) related to the filename can be returned for further processing. For example, when a matching filename is located in the file table the PBAs associated with the filename can be returned (e.g., the PBAs for physical memory locations of the file data represented by the filename). At 625, the PBAs can be employed to access physical memory locations to facilitate access of data related to a memory located at the physical memory location. For example, where PBAs store the physical memory locations of data stored in a core component 120, the PBAs can be, for example, decoded to allow the data stored at those memory locations to be accessed (e.g., read). At 630, the data accessed at the physical memory locations indicated by the PBAs (e.g., the read data) can be read out of the memory device 110 and provided as an output. For instance, the data can be read from the memory device 110 and transmitted to the requester, such as, for example, a host processor (not shown). At this point, methodology 600 can end.

Conventionally, a read method can include searching an LBA table for a filename. The returned LBAs can then require translating into PBAs to facilitate accessing the physical memory locations. This process requires additional computational steps and can result in slower memory access times. Employing methodology 600 can reduce data access times, in part, by avoiding the translation of LBAs into PBAs.

Typically, read operations do not require modification of a PBA in a conventional LBASYS memory device. However, despite not updating the PBA in a read, the LBA system still can require LBA to PBA translation for accessing the physical memory locations holding the desired data. Thus, in asymmetric data access conditions (e.g., more read operations than write or reclaim operations) employing methodology 600 can yield even more significant reductions in data access times.

Figure 7:
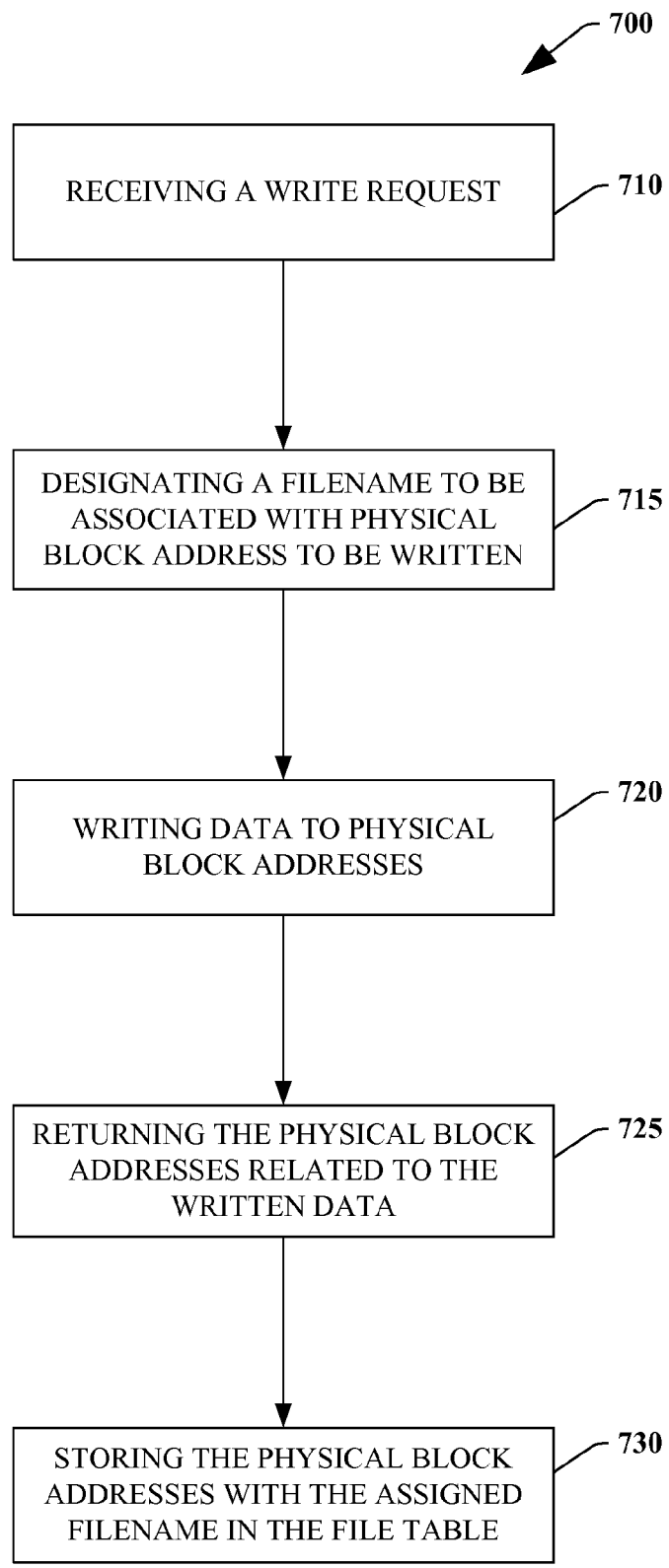
FIG. 7 illustrates a methodology that facilitates reclaiming a portion of memory while preserving valid data in accordance with an aspect of the disclosed subject matter.

Referring now to FIG. 7, illustrated is a methodology 700 that facilitates storing data associated with a memory (e.g., memory component 110) in accordance with an aspect of the disclosed subject matter. Conventionally, a write method can include translating PBAs returned from writing to a physical memory location into LBAs for populating an LBA file table. This process can require additional computational steps and can result in slower memory write operation times. Employing methodology 700 can reduce data access times, in part, by avoiding the translation of LBAs into PBAs.

At 710, a write request command can be received. For example, a write command can be generated in system 100 and passed to the file management component 130 to write file data into core component 120. The write request can include a filename specifying the file to be written. The write request can further include data to be written that is related to a file represented by the filename. At 715, the filename can then be designated in a file table, among others (e.g., other data structures can be used to store filenames and PBAs as discussed herein). The file table can be, for example, an array of filenames and PBA tuples 440 as illustrated in FIG. 4.

At 720, the file data can be written to physical memory locations (e.g., memory cells in memory cell array 410). For example, where a write request is passed in with the filename FOO, and the data [A, B, C], FOO can be added to a file table and A can be written to memory cell X1, B can be written to X2, and C can be written to Y1. At 725, PBAs associated with the written file data can be returned. For example, X1, X2, and Y1 can be returned. At 730, the returned PBAs can be associated with the designated filename to form a filename and PBA data tuple, for example, as depicted in FIG. 4. For example, in the file table, <FOO:NULL> can be updated to the tuple <FOO:X1 X2 Y2> such that the PBAs of the FOO data (e.g., X1, X2, and Y1) are associated with the filename (e.g., FOO) representing the FOO file. At this point, methodology 700 can end.

Figure 8:
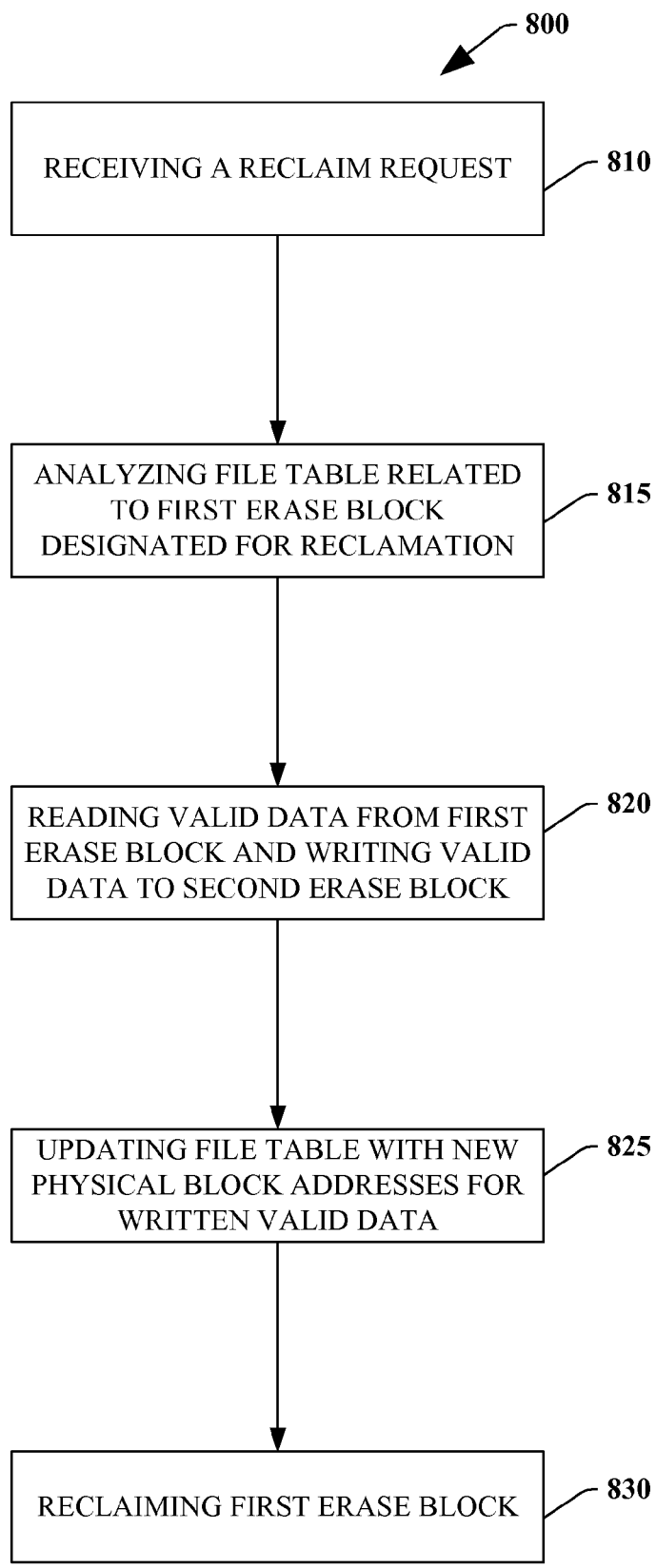
FIG. 8 illustrates a methodology that facilitates preserving valid data in a partially defective memory while accessing data associated with the memory in accordance with an aspect of the disclosed subject matter.

Referring now to FIG. 8, illustrated is a methodology 800 that facilitates reclaiming a portion of memory (e.g., core component 120) while preserving valid data in accordance with an aspect of the disclosed subject matter. In methodology 800, a reclaim request can indicate a specific erase block to be reclaimed or can indicate that an erase block can be selected according to predefined parameters or inferential selection of an appropriate erase segment unit for reclamation.

At 810, a reclaim request can be received. The reclaim request can be for example, for a specific segment of memory (e.g., a specific erase block(s)) or can be a general reclaim request for an entire memory, such as a core component 120 (e.g., similar to a hard disk defragment). At 815, a file table related to the data blocks in an erase block to be reclaimed is analyzed to determine what data thereon is valid. Validity of data is generally related to a PBA being located in a filename and PBA tuple in the file table, however, alternative criteria can be applied to determining the validity of data, for example, bad erase block determinations, or redundancy of data where data compression is employed, among others. At 820, valid data PBAs can be relocated. For example, the valid data PBA(s) can be read from the erase block to be reclaimed and written to a second erase block to, for example, facilitate optimum memory consumption (e.g., similar to defragmentation of data). This can, for example, create a more compact copy of the data from the first erase block on the second erase block and result in the first erase block only containing redundant valid data (because this valid data can also be found in the second erase block).

At 825, the new PBAs can be updated to the filename and PBA tuples in the file table. For example, the valid data on the second erase block will typically have new PBAs. These new PBAs can be updated to the file table to indicate the new location of the data stored in the new physical memory location (e.g., the second erase block). At 830, the older redundant data locations can be reclaimed. For example, after the file table has been updated with the new PBAs (e.g., PBAs associated with the data on the second erase block) by overwriting the old PBAs (e.g., PBAs associated with the data on the first erase block), the first erase block can be reclaimed. Reclamation of the first erase block typically includes erasing all pages containing data blocks (e.g., setting all data pages in the erase block to a predetermined value) so that they can be reused in future memory operations. At this point, methodology 800 can end.

Figure 9:
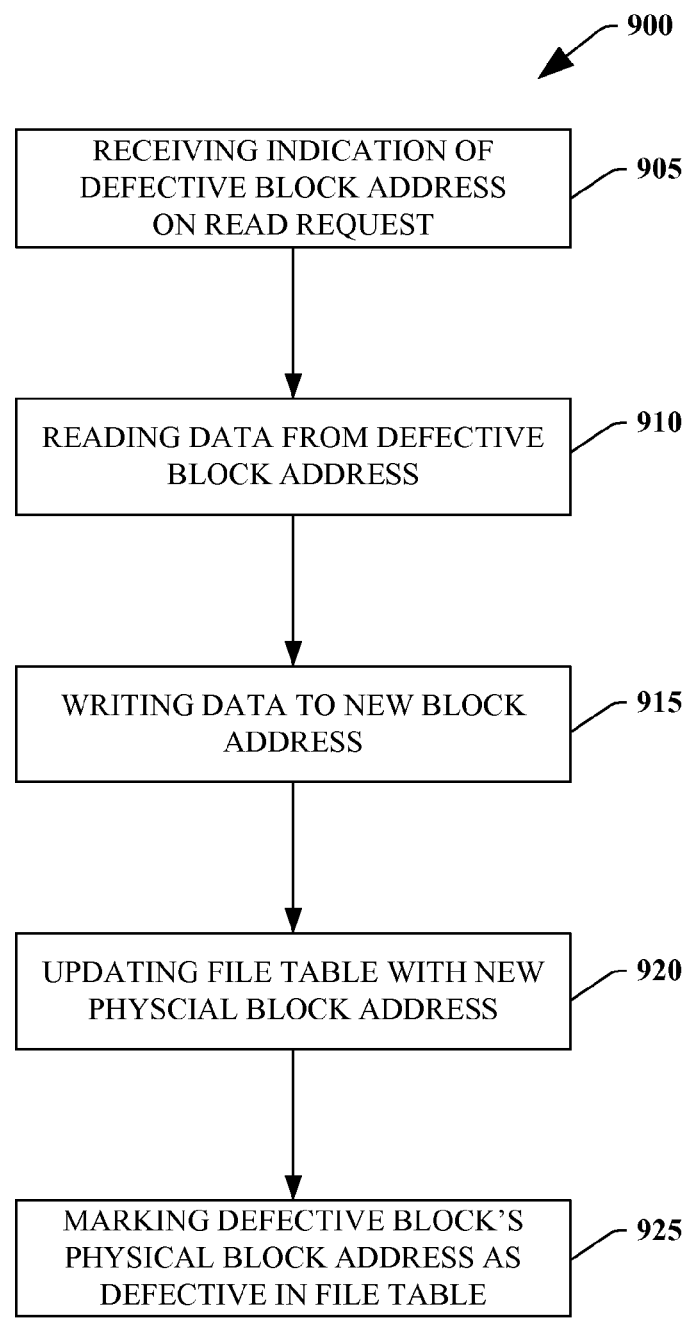
FIG. 9 illustrates a methodology that facilitates preserving valid data in a partially defective memory while storing data associated with the memory in accordance with an aspect of the disclosed subject matter.

Referring now to FIG. 9, physical memory locations can degrade or be defective inhibiting proper memory access. A methodology (e.g., methodology 900) that can accommodate for defective memory (e.g., bad erase block management, among others) can improve effective yields of memory devices (e.g., memory component 110) due to a greater tolerance for inherent defects and facilitate a more rugged memory for end user consumption by adapting to changing memory conditions.

In FIG. 9, illustrated is a methodology 900 that facilitates preserving valid data in a partially defective memory (e.g., relocating data to non-defective memory locations) while accessing data (e.g., reading data) associated with the memory (e.g., memory component 110) in accordance with an aspect of the disclosed subject matter. At 905, an indication of a defective physical memory location can be received during a read request operation. For example, a bad erase block management component (not illustrated) or error correcting code (ECC) component (not illustrated) can send an indication to methodology 900 that bad erase block(s) (e.g., blocks of memory with at least one defective physical memory location) have been identified and the location of the bad erase blocks. In another example, the read methodology 600 can further include a memory area integrity validation action (not illustrated) to check memory areas during a read command operation.

At 910, in response to the indication of defective physical memory locations, data at the defective physical memory location can be accessed. For example, in response to an ECC indicating a defective physical memory location, data stored in the write block containing the defective memory physical location can be read. At 915, the data accessed in the defective physical memory can be written to a new physical memory location. For example, where a physical memory location has become defective, as indicated by an ECC parity bit, the data from the write block containing the defective physical memory location can be read from the write block and written to a new non-defective write block. Correction of the data located at the defective physical memory location, now rewritten to a non-defective write block can be accomplished by an additional act(s) (not illustrated) in a methodology 900 or through later processing (not illustrated).

At 920, the file table (among others) can be updated. For example, where the file table PBAs indicate the location of data at the defective physical memory location, the table can be updated with the new PBA(s) of the data moved to the non-defective write block. At 925, the defective physical memory location can be marked in the file table to prevent future use of the block containing the defective physical memory location. At this point, methodology 900 can end.

Figure 10:
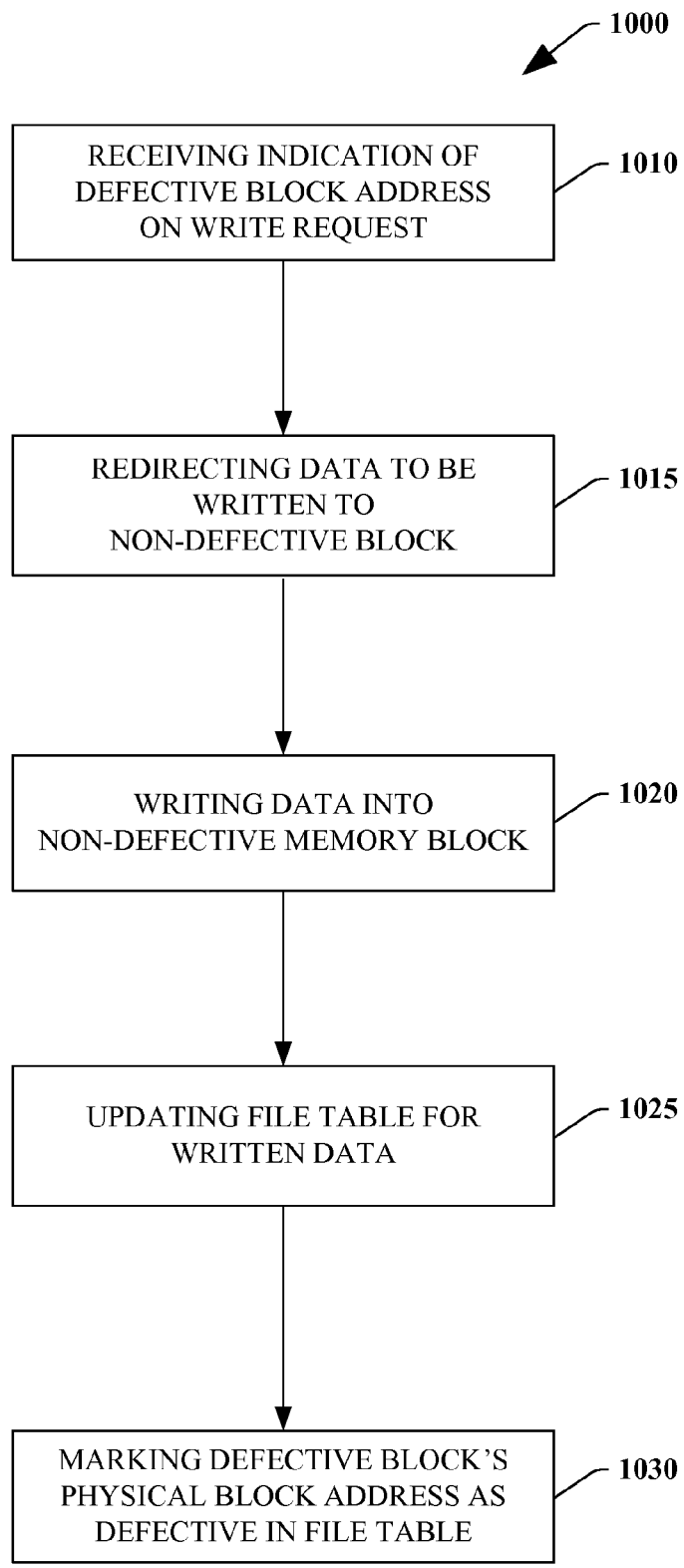
FIG. 10 illustrates a block diagram of an exemplary electronic device that can utilize a memory device(s) in accordance with an aspect of the disclosed subject matter.

Referring to FIG. 10, illustrated is a methodology 1000 that facilitates preserving valid data in a partially defective memory (e.g., memory component 110) while storing data associated with the memory in accordance with an aspect of the disclosed subject matter. At 1010, an indication of a defective memory location can be received during a write operation (e.g., from a bad erase block management component (not illustrated), an error correcting code (ECC) component (not illustrated), a write methodology 700 that further includes a memory block integrity validation action (not illustrated) to check memory blocks during a write command operation, among others). At 1015, data that was to be written to defective memory location can be redirected to a new memory block. For example, where a bad physical memory location is indicated, the data that was to be written to that memory cell can be redirected to a non-defective physical memory location for writing. At 1020, the redirected data can be written to the non-defective physical memory location. For example, where a first write block is found to have a defective memory cell the data to be written there can be redirected to a new write block that is non-defective and can then be written into the physical memory locations at the new non-defective block. At 1025, the file table can be updated with PBAs for the written data (e.g., with PBAs for the data written uneventfully and for the data that was redirected from the defective to the non-defective memory location). For example, the data originally designated to be written into a defective memory block and then redirected and written into a non-defective physical memory location can have the associated PBAs written to the file table to represent where the data is located. At 1030, the defective write blocks (e.g., write blocks containing one or more defective physical memory locations) can be marked as defective in the file table to avoid future use of the bad blocks. At this point, the methodology 1000 can end.

Figure 11:
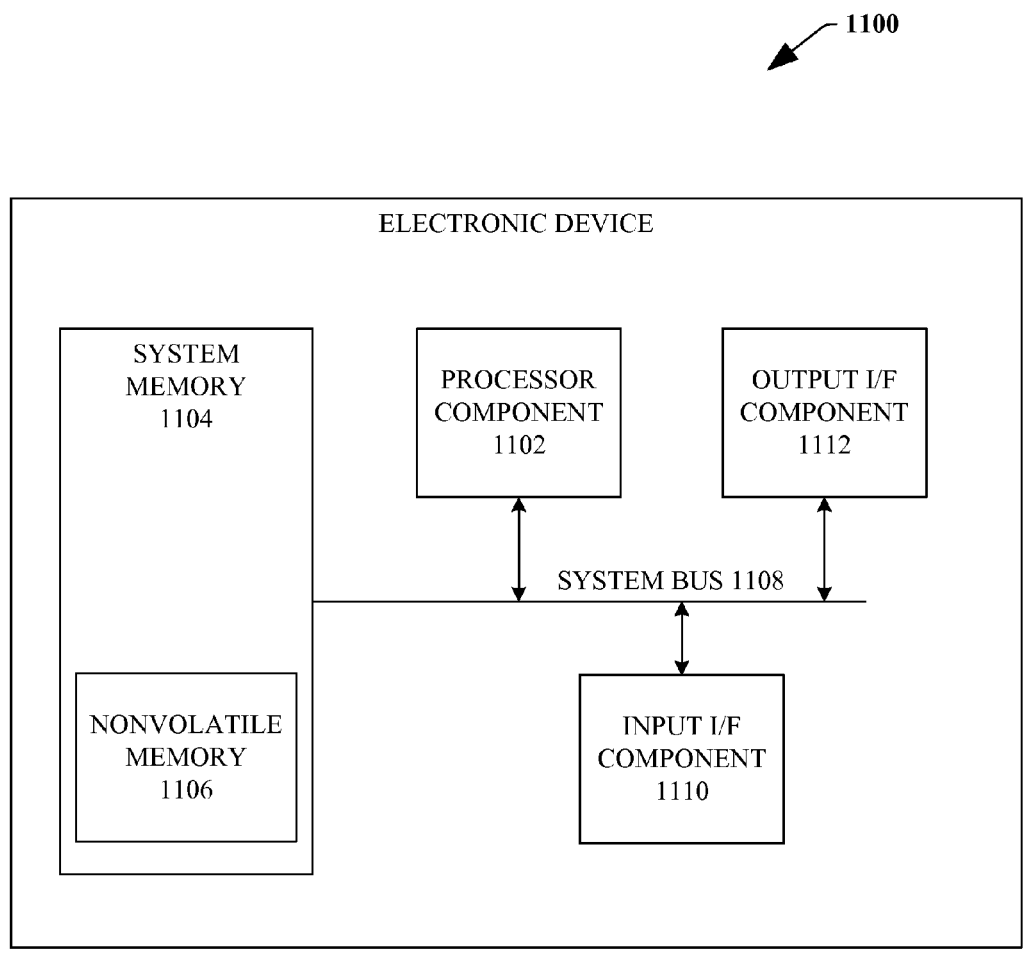
FIG. 11 illustrates a block diagram of an exemplary electronic device that can utilize a memory device(s) in accordance with an aspect of the disclosed subject matter.

Referring to FIG. 11, illustrated is a block diagram of an exemplary, non-limiting electronic device 1100 that can include a memory device that can store data in accordance with one aspect of the disclosed subject matter. The electronic device 1100 can include, but is not limited to, a computer, a laptop computer, network equipment (e.g. routers, access points), a media player and/or recorder (e.g., audio player and/or recorder, video player and/or recorder), a television, a smart card, a phone, a cellular phone, a smart phone, an electronic organizer, a PDA, a portable email reader, a digital camera, an electronic game (e.g., video game), an electronic device associated with digital rights management, a Personal Computer Memory Card International Association (PCMCIA) card, a trusted platform module (TPM), a Hardware Security Module (HSM), a set-top box, a digital video recorder, a gaming console, a navigation system or device (e.g., global position satellite (GPS) system), a secure memory device with computational capabilities, a device with a tamper-resistant chip(s), an electronic device associated with an industrial control system, an embedded computer in a machine (e.g., an airplane, a copier, a motor vehicle, a microwave oven), and the like.

Components of the electronic device 1100 can include, but are not limited to, a processor component 1102, a system memory 1104 (with nonvolatile memory 1106), and a system bus 1108 that can couple various system components including the system memory 1104 to the processor component 1102. The system bus 1108 can be any of various types of bus structures including a memory bus or memory controller, a peripheral bus, or a local bus using any of a variety of bus architectures.

Electronic device 1100 can typically include a variety of computer readable media. Computer readable media can be any available media that can be accessed by the electronic device 1100. By way of example, and not limitation, computer readable media can comprise computer storage media and communication media. Computer storage media can include volatile, non-volatile, removable, and non-removable media that can be implemented in any method or technology for storage of information, such as computer readable instructions, data structures, program modules or other data. Computer storage media includes, but is not limited to, RAM, ROM, EEPROM, nonvolatile memory 1106 (e.g., flash memory), or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by electronic device 1100. Communication media typically can embody computer readable instructions, data structures, program modules or other data in a modulated data signal such as a carrier wave or other transport mechanism and includes any information delivery media.

The system memory 1104 can include computer storage media in the form of volatile and/or nonvolatile memory 1106 (e.g., memory component 110, adapted versions of generic memory system 300, etc.). A basic input/output system (BIOS), containing the basic routines that help to transfer information between elements within electronic device 1100, such as during start-up, can be stored in memory 1104. Memory 1104 can typically contain data and/or program modules that can be immediately accessible to and/or presently be operated on by processor component 1102. By way of example, and not limitation, system memory 1104 can also include an operating system, application programs, other program modules, and program data.

The nonvolatile memory 1106 can be removable or non-removable. For example, the nonvolatile memory 1106 can be in the form of a removable memory card or a USB flash drive. In accordance with one aspect, the nonvolatile memory 1106 can include flash memory (e.g., single-bit flash memory, multi-bit flash memory), ROM, PROM, EPROM, EEPROM, or NVRAM (e.g., FeRAM), or a combination thereof, for example. Further, the flash memory can comprise NOR flash memory and/or NAND flash memory.

A user can enter commands and information into the electronic device 1100 through input devices (not shown) such as a keypad, microphone, tablet or touch screen although other input devices can also be utilized. These and other input devices can be connected to the processor component 1102 through input interface component 1112 that can be connected to the system bus 1108. Other interface and bus structures, such as a parallel port, game port or a universal serial bus (USB) can also be utilized. A graphics subsystem (not shown) can also be connected to the system bus 1108. A display device (not shown) can be also connected to the system bus 1108 via an interface, such as output interface component 1112, which can in turn communicate with video memory. In addition to a display, the electronic device 1100 can also include other peripheral output devices such as speakers (not shown), which can be connected through output interface component 1112.

It is to be understood and appreciated that the computer-implemented programs and software can be implemented within a standard computer architecture. While some aspects of the disclosure have been described above in the general context of computer-executable instructions that may run on one or more computers, those skilled in the art will recognize that the technology also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices (e.g., PDA, phone), microprocessor-based or programmable consumer electronics, and the like, each of which can be operatively coupled to one or more associated devices.

The illustrated aspects of the disclosure may also be practiced in distributed computing environments where certain tasks are performed by remote processing devices that are linked through a communications network. In a distributed computing environment, program modules can be located in both local and remote memory storage devices.

As utilized herein, terms "component," "system," "interface," and the like, can refer to a computer-related entity, either hardware, software (e.g., in execution), and/or firmware. For example, a component can be, but is not limited to being, a process running on a processor, a processor, a circuit, a collection of circuits, an object, an executable, a thread of execution, a program, and/or a computer. By way of illustration, both an application running on a server and the server can be a component. One or more components can reside within a process and a component can be localized on one computer and/or distributed between two or more computers.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the disclosed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Artificial intelligence based systems (e.g., explicitly and/or implicitly trained classifiers) can be employed in connection with performing inference and/or probabilistic determinations and/or statistical-based determinations as in accordance with one or more aspects of the disclosed subject matter as described herein. As used herein, the term "inference," "infer" or variations in form thereof refers generally to the process of reasoning about or inferring states of the system, environment, and/or user from a set of observations as captured through events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

For example, an artificial intelligence based system can evaluate current or historical evidence associated with data access patterns (e.g., observations that write operations are of a typical size such as a camera regularly taking one (1) megapixel images allowing for preparative leveling of memory space, observations that a period of idle time that can be used for reclaiming processes regularly occurs when a device is in a particular mode such as when a cell phone user is in a conversation, . . . ) and based in part in such evaluation, can render an inference, based in part on probability, regarding, for instance, optimally using idle time for memory reclamation processes, memory leveling, predicting when a write could encounter defective memory space and accommodating to avoid the defective memory, combinations thereof, or others. One of skill in the art will appreciate that intelligent and/or inferential systems can facilitate further optimization of the disclosed subject matter and such inferences can be based on a large plurality of data and variables all of with are considered within the scope of the subject innovation.

What has been described above includes examples of aspects of the disclosed subject matter. It is, of course, not possible to describe every conceivable combination of components or methodologies for purposes of describing the disclosed subject matter, but one of ordinary skill in the art will recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system that facilitate access of data associated with an electronic memory, comprising:
    a physical block address file management component that is configured to comprise at least one physical block address data structure having at least one identifier field comprising at least one identifier and at least one physical block address field comprising at least one physical block address associated with the at least one identifier, the physical block address file management component is further configured to perform a direct physical block address table look-up to identify the at least one physical block address, based at least in part on the at least one identifier and a received request relating to the at least one identifier, when at least one predefined asymmetric data access condition is met at least in relation to at least one file associated with the at least one identifier, wherein the physical block address file management component is further configured to access data associated with the at least one file without employing logical block address translation during the direct physical block address table look-up, and wherein the physical block address file management component is further configured to comprise
    a logical block address component that is configured to perform a logical block address to physical block address translation to facilitate access to data associated with the at least one file, based at least on part on a logical block address, at least when the at least one predefined asymmetric data access condition is not met at least in relation to the at least one file associated with the at least one identifier, wherein the at least one predefined asymmetric condition is that more read operations have been performed than write operations at least in relation to the at least one file; and
    at least one physical memory location that is configured to at least one of store at least one data value, read at least one data value, or erase at least one data value, based at least in part on at least one of the at least one physical block address data structure.

2. The system of claim 1, wherein the logical block addressing component is included to provide legacy support to devices that are not enabled for direct physical block address management.

3. The system of claim 2, wherein the logical block addressing component is further configured to facilitate mixed mode block address management or complementary mode block address management.

4. The system of claim 3, further comprising an inferential component that is configured to facilitate optimizing access of data associated with the electronic memory under mixed mode block address management or complementary mode block address management.

5. The system of claim 1, further comprising:
    a physical block address file system component that is configured to facilitate management of the at least one physical block address data structure; and a physical block driver component that is configured to facilitate accessing physical memory locations related to physical block address data.

6. The system of claim 5, wherein the physical block address file system component and the physical block driver component form at least a portion of a tightly coupled embedded system.

7. The system of claim 1, wherein the at least one physical block address data structure form at least a portion of a file table, the at least one identifier field can store a filename, and one or more of the at least one physical block address field can store a physical block address, such that access to the data associated with the filename and stored at a physical memory location is facilitated by searching through the file table and extracting the physical block addresses of the physical memory location of the data indicated by the respective filename.

8. The system of claim 1, further comprising an inferential component that at least in part is configured to facilitate determinations of at least one of: when to, or, upon which portions of memory to, execute reclaim operations, garbage collection operations, wear leveling operations, or bad block management operations.

9. An electronic device comprising at least a portion of the system of claim 1.

10. The electronic device of claim 9, wherein the electronic device comprises at least one of a computer, a laptop computer, network equipment, a media player, a media recorder, a television, a smart card, a phone, a cellular phone, a smart phone, an electronic organizer, a personal digital assistant, a portable email reader, a digital camera, an electronic game, an electronic device associated with digital rights management, a Personal Computer Memory Card International Association (PCMCIA) card, a trusted platform module (TPM), a Hardware Security Module (HSM), a set-top box, a digital video recorder, a gaming console, a navigation device, a secure memory device with computational capabilities, a device with at least one tamper-resistant chip, an electronic device associated with industrial control systems, or an embedded computer in a machine, wherein the machine comprises one of an airplane, a copier, a motor vehicle, or a microwave oven.

11. A method that facilitates accessing data associated with a memory, comprising:
receiving at least one physical block address from a file management table employed for direct physical block address look-up based at least in part on a file identifier and a command identifying the file identifier, when at least one predefined asymmetric data access condition is met at least in relation to a file associated with the file identifier; and
accessing at least one physical memory location associated with the file to access data associated with the file, based at least in part on the at least one physical block address, without employing logical block address translation during the direct physical block address look-up when the at least one predefined asymmetric data access condition is met at least in relation to the file, and performing a logical block address to physical block address translation to facilitate accessing the data associated with the file, based at least on part on a logical block address, at least when the at least one predefined asymmetric data access condition is not met at least in relation to the file, wherein the at least one predefined asymmetric condition is that more read operations have been performed than write operations at least in relation to the file.

12. The method of claim 11, further comprising:
receiving the file identifier; and
searching the file management table for physical block data associated therein with the file identifier.

13. The method of claim 11, further comprising:
storing the file identifier in the file management table;
associating the at least one physical block address related to data written to a physical memory with the file identifier.

14. The method of claim 11, further comprising:
compacting data in physical memory locations, comprising:
analyzing a file table related to a first erase block for at least one valid data physical block addresses;
copying valid data from the first erase block to a second erase block based at least in part on the at least one valid data physical block addresses where at least one valid data physical block address is located in the file management table;
updating the file management table with the new physical block addresses of the valid data copied to the second erase block.

15. The method of claim 14, further comprising erasing the first erase block to facilitate making the first erase block available for new data operations.

16. The method of claim 11, further comprising:
accessing data associated with a memory having one or more defective physical memory locations, further comprising:
receiving an indication of a defective physical memory location;
copying data from the defective physical memory location to a non-defective physical memory location;
updating the file management table with a new physical block address associated with the copied data in the new location; and
flagging the defective memory location as defective to prevent future use of the defective memory location.

17. The method of claim 11, further comprising:
storing data associated with a memory having one or more defective physical memory locations, further comprising:
receiving an indication of a defective physical memory location;
writing data at a different non-defective physical memory location;
updating the file management table with a new physical block address associated with the data written in the non-defective location; and
flagging the defective memory location as defective to prevent future use of the defective memory location.

18. A system that facilitates access of data associated with an electronic memory comprising:
means for correlating a data identifier and at least one physical block address associated with a memory; and
means for identifying the at least one physical block address, based at least in part on the data identifier, to perform at least one memory operation on data at a physical memory location addressed by the at least one physical block address without requiring translating between, to, or from, the at least one physical block address and a logical block address, when at least one predefined asymmetric data access condition is met at least in relation to at least one file associated with the data identifier, wherein the means for identifying accesses data associated with the at least one file without employing logical block address translation during a direct physical block address table look-up employed to identify the at least one physical block address, and wherein the means for identifying performs a logical block address to physical block address translation to facilitate accessing data associated with the at least one file, based at least on part on a logical block address, at least when the at least one predefined asymmetric data access condition is not met at least in relation to the at least one file associated with the data identifier, wherein the at least one predefined asymmetric condition is that more read operations have been performed than write operations at least in relation to the at least one file.

* * * * *